Aug. 25, 1931.  J. CAPELLMAN  1,820,778
GLASS EDGING MACHINE
Filed Oct. 26, 1928  5 Sheets-Sheet 3

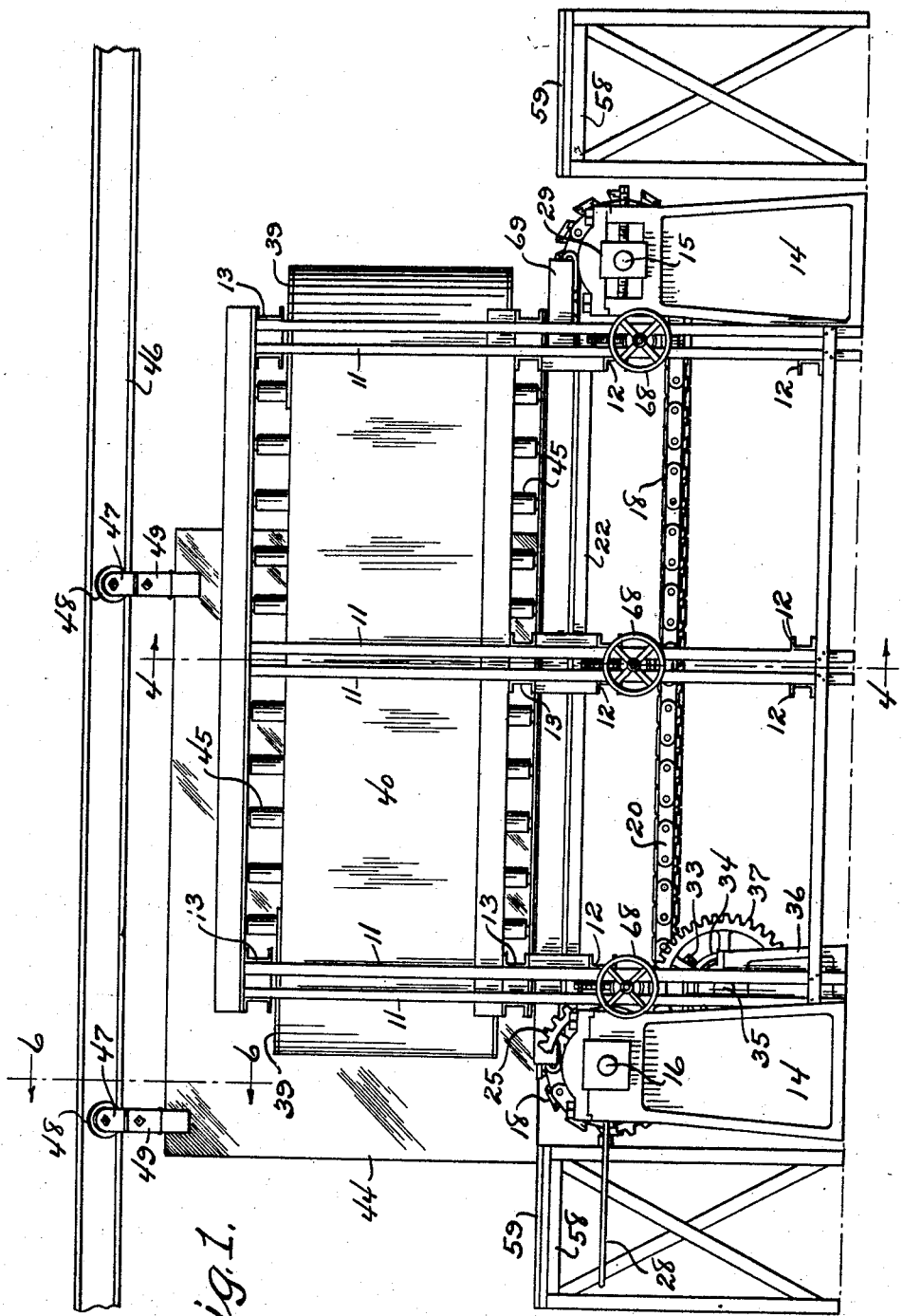

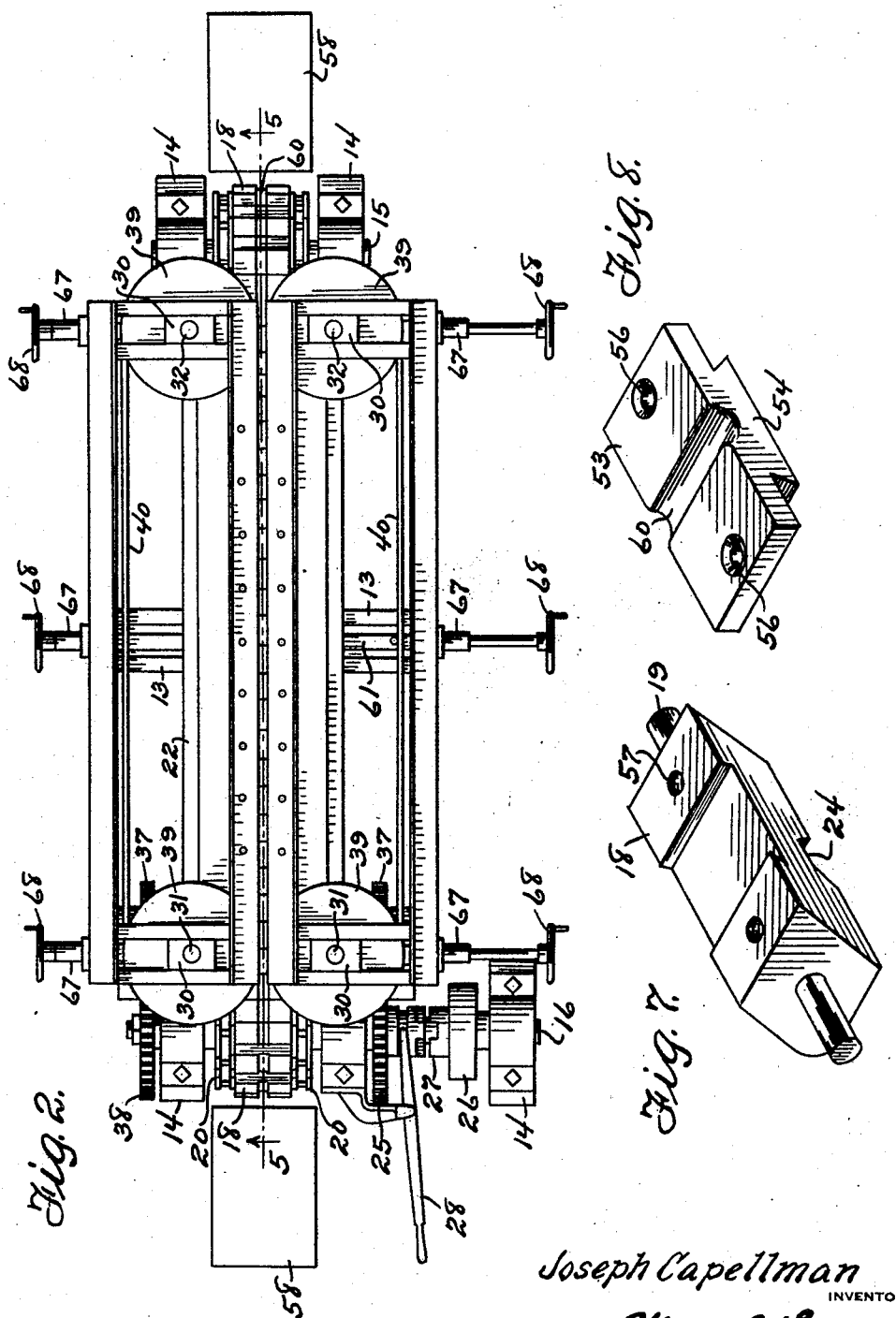

Joseph Capellman
INVENTOR

BY Victor J. Evans
ATTORNEY

WITNESS:

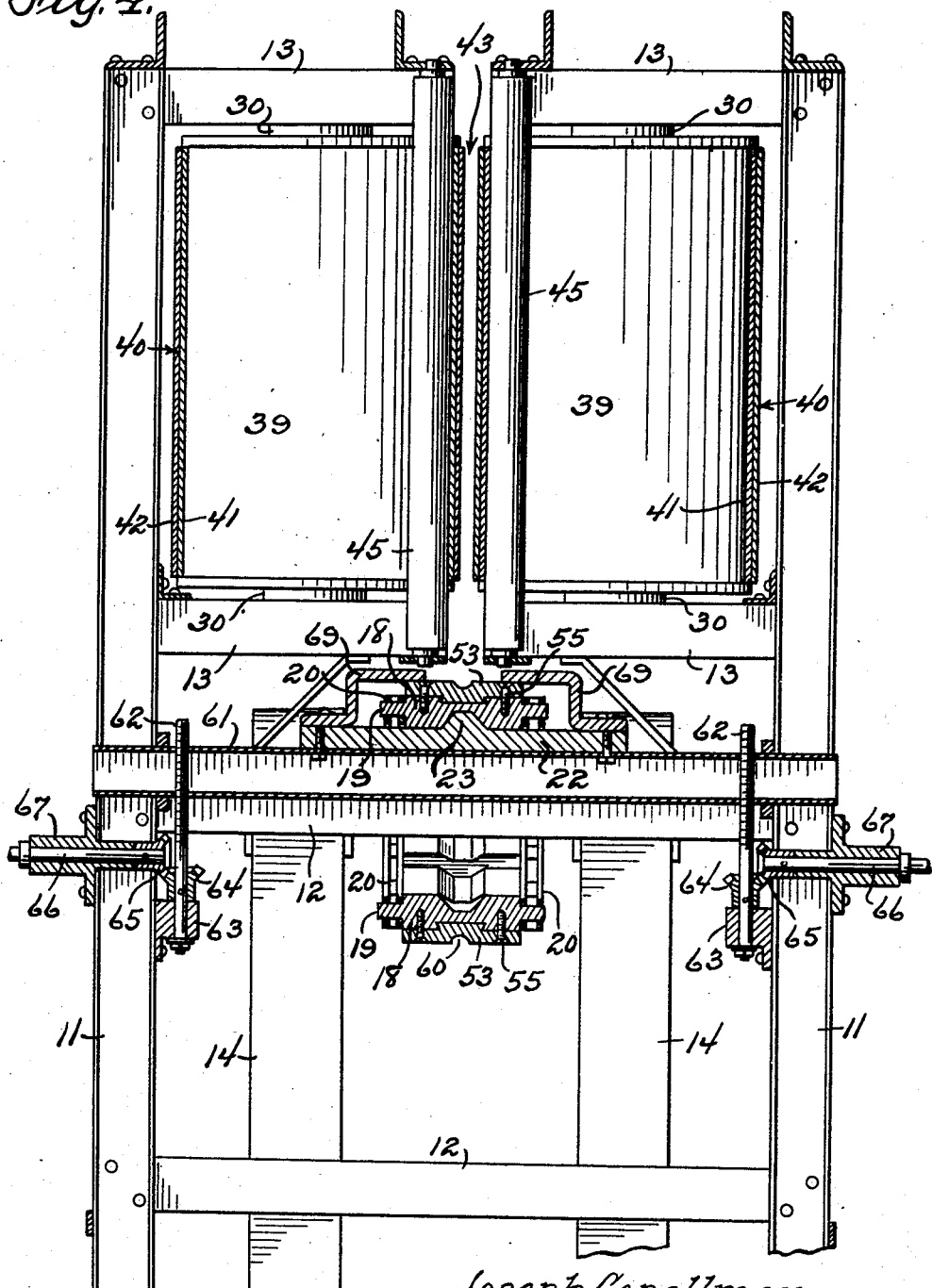

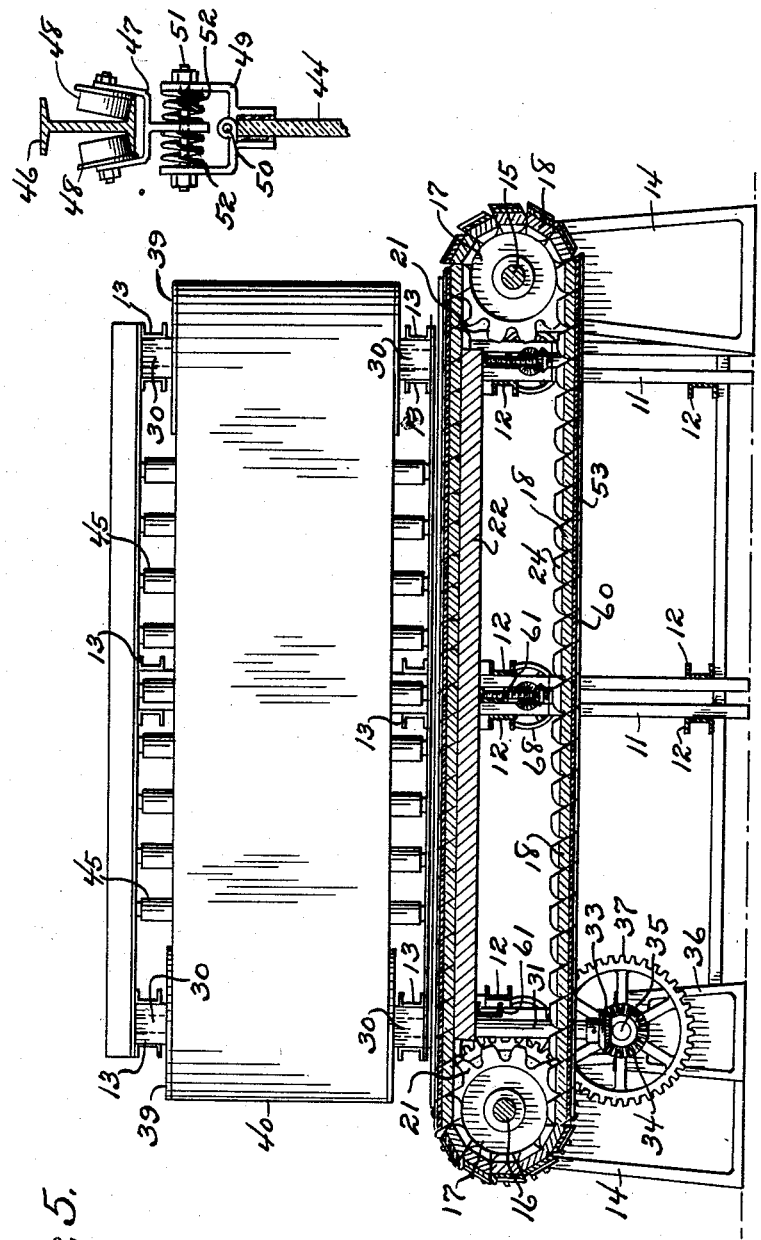

Patented Aug. 25, 1931

1,820,778

UNITED STATES PATENT OFFICE

JOSEPH CAPELLMAN, OF TARENTUM, PENNSYLVANIA

GLASS EDGING MACHINE

Application filed October 26, 1928. Serial No. 315,235.

This invention relates to edging machines and has for an object the provision of a machine for edging panels or slabs, the invention being especially adapted for edging glass.

Another object of the invention is the provision of a machine by means of which the glass may be automatically fed through the machine at a uniform rate of speed and a uniform pressure applied throughout the edge of the glass, so that the said edge will be true and even for its entire length.

Another object of the invention is the provision of a machine which may be adjusted to grind the glass accurately and to a given size.

Another object of the invention is the provision of an edging machine in which the edging elements are interchangeable so that the edge may be ground, smoothed, and polished with a single machine, or separate machines of a like character may be used for each operation, the only difference residing in the edging elements.

Another object of the invention is the provision of a machine which may be arranged to edge either straight or curved edge glass, such as the lower edge of the windshield of an automobile.

With the above and other objects in view, the invention further includes the following novel features and details of construction, to be hereinafter more fully described, illustrated in the accompanying drawings and pointed out in the appended claims.

In the drawings:—

Figure 1 is an elevation of a glass edging machine constructed in accordance with the invention.

Figure 2 is a top plan view of the machine with the track and glass both omitted.

Figure 4 is an enlarged sectional view on the line 4—4 of Figure 1 with the glass panel omitted.

Figure 5 is a section on the line 5—5 of Figure 2.

Figure 6 is an enlarged fragmentary section on the line 6—6 of Figure 1.

Figure 7 is a detail perspective view of the carrier.

Figure 8 is a similar view of the edging element.

Figure 9:
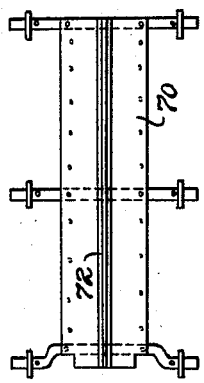
Figure 9 is a plan view of a curved bearing plate.

Referring to the drawings in detail wherein like characters of reference denote corresponding parts, the machine illustrated comprises a frame which includes vertically disposed standards 11 which may be arranged in pairs as shown in Figure 1 of the drawings and connected by cross beams 12 and 13, the latter being relatively short beams for supporting the feed belt rollers to be hereinafter described.

Mounted in bearing standards 14 at opposite ends of the machine are shafts 15 and 16. These shafts support rollers 17 around which travels an endless carrier.

The carrier just mentioned is formed of individual carrier blocks 18 from the opposite ends of which extend trunnions 19, the latter being connected with chains 20. The chains 20 travel around sprockets 21 at opposite ends of the machine and the upper flights of the chains travel over a bearing plate 22. This bearing plate is provided with a centrally arranged rib 23 which extends longitudinally of the plate and the blocks 18 are provided with centrally located recesses 24 which take over the rib 23 so as to guide the blocks and cause them to travel in a direct line over the bearing plate.

The shaft 16 has mounted thereon a gear 25 and mounted for free rotation upon this shaft is a pulley 26 which is locked to the shaft by means of a clutch 27 which is controlled by a lever 28. The shaft 16 may thus be engaged with and disengaged from a suitable source of power for controlling its rotation.

The shaft 15 is mounted in an adjustable bearing 29, so that the chains 20 may be adjusted for proper operation.

Mounted in bearings 30 above the bearing plate 22 are shafts 31 and 32, the first mentioned shafts having secured thereto beveled gears 33 which are driven by beveled gears 34 mounted upon stub shafts 35. These last mentioned shafts are mounted in suitable bearing standards 36 and carry gears 37. These last mentioned gears are engaged and driven by the gear 25 and a gear 38, both mounted upon the shaft 16.

The shafts 31 and 32 carry vertically disposed rollers 39 around which travel feed belts 40. These belts preferably consist of an inner leather belt 41 having an outer facing of rubber 42. By reference to Figure 4 of the drawings it will be seen that the belts 40 are horizontally spaced, the space which is indicated at 43 being directly above the center of the carrier blocks and being adapted to receive the glass or other panel 44 to be edged. In order that proper pressure may be brought upon opposite side faces of the panel 44, the inner flights of the belts 42 are reinforced by rollers 45 which are spaced along and bear upon the inner faces of these belts.

Positioned above the machine is a rail 46, which as shown in Figure 6 of the drawings, is preferably an I beam. This rail supports a carriage 47 which includes rollers 48, the latter travelling along the beam. Depending from the carriage 47 is a clamp which comprises jaws 49 which are pivotally mounted as at 50 for clamping engagement upon opposite faces of the panel 44. The jaws are connected by means of a rod 51 which supports springs 52 whose function is to yieldingly hold the jaws in clamping position.

The carrier blocks 18 have removably secured thereto edging elements 53. These elements may consist of blocks of rough emery, carborundum, smooth stone, cork, wood or pumice stone. The edging elements have a dove-tailed engagement with the blocks 18 as shown at 54 and are further held in position by means of screws 55. These screws pass through openings 56 provided in the edging elements and engage threaded sockets 57 in the carrier blocks 18. The edging elements are thus removably secured in place so that the machine may be used either for grinding, smoothing or polishing by inserting the proper type of edging element for the work intended. It is obvious that if desired three machines may be used, the first being arranged for grinding, the second for smoothing, and the third for polishing.

Located at each end of the machine is a table 58. These tables are provided with a covering 59 of leather or other suitable material and the glass panel is slid along this table between the feed belts 40 and is gripped and carried by these belts through the machine while the edging elements are acting upon the lower edge of the panel. The clamps 49, one of which is engaged near each end of the panel, act to positively grip and hold the panel in a direct vertical position and causes it to travel in a direct horizontal line so as to provide a proper edge at the bottom of the panel. The edging elements 54 are provided with grooves 60 within which the bottom edge of the glass rests so that this edge of the glass is properly held in position as the edging elements travel in a direct line due to the engagement of the carrier blocks with the rib 23.

In order to properly regulate the horizontal position of the abrasive element, the bearing plate 22 is vertically adjustable. For this purpose, the plate 22 is secured to beams 61 which extend transversely of the frame and are spaced longitudinally thereof. These beams have their opposite ends threadedly engaged by vertically disposed rods 62 whose lower ends are mounted in bearing blocks 63. Secured to the rods 62 are beveled gears 64 which are driven by beveled gears 65 mounted upon shafts 66 which extend into the frame. These last referred to shafts are mounted in bearings 67 carried by the frame and have secured upon their outer ends hand wheels 68. By means of the hand wheels 68, the threaded shafts 62 may be rotated to adjust the position of the beams 61 and thus regulate the position of the bearing plate so that the latter may be adjusted to the proper width of the glass panel and the measurements of the latter will be accurate when the edging operation is completed.

Guard rails 69 are secured along opposite edges of the bearing plate 22 and extend inwardly over the edges of the edging elements so that practically all of the moving parts will be protected.

Figure 10:
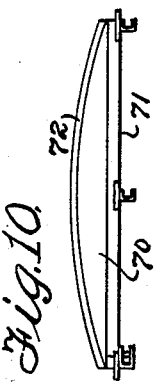
Figure 10 is a side view of the same.
Figure 3:
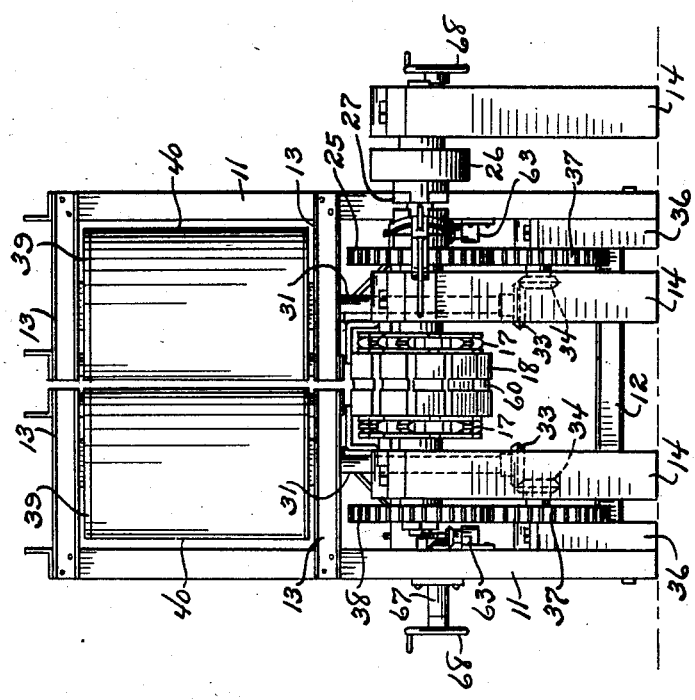
Figure 3 is an end view.

In order to provide a curved edge upon a glass or other panel, a curved bearing plate 70 such as is illustrated in Figures 9 and 10 of the drawings may be provided. This curved bearing plate is arranged upon a suitable supporting structure 71 which may be substituted for the beams 61 and is provided with a longitudinally extending rib 72. The carrier blocks may move over the plate 70 after the manner of the movement of these blocks over the plate 22. If desired however, the plate 70 may be longitudinally grooved and a suitable abrasive powder placed within the groove.

As the contour of the bearing plate 70 will be the same as the contour of the curved edge of the panel, the said edge will be accurately curved. This adapts the invention especially for use in finishing the curved edges at the bottom of windshield glass.

The invention is susceptible of various changes in its form, proportions and minor details of construction and the right is herein reserved to make such changes as properly fall within the scope of the appended claims.

Having described the invention what is claimed is:—

1. In an edging machine, an endless carrier including a plurality of flexibly connected blocks having transversely disposed grooves in one face, means to movably mount the carrier, edging elements mounted upon the other face of the blocks, a backing plate, a rib disposed longitudinally of the backing plate for engagement within the grooves of the blocks to guide the same and hold the edging elements in properly aligned relation, and means to movably support and guide the work in contact with the edging elements.

2. In an edging machine, an endless carrier including a plurality of flexibly connected blocks having transversely disposed grooves in one face, means to movably mount the carrier, edging elements mounted upon the other face of the blocks, a backing plate, a rib disposed longitudinally of the backing plate for engagement within the grooves of the blocks to guide the same and hold the edging elements in properly aligned relation, means to movably support and guide the work in contact with the edging elements, and means to adjust the backing plate to regulate contact of the edging elements with the work.

3. In an edging machine, a frame including spaced vertically disposed standards, upper and lower horizontally disposed beams connecting the same, a horizontally disposed endless carrier movable above and below the upper beams, edging elements mounted upon and movable with the carrier to act upon the work, transversely spaced opposed parallel belts supported for movement above the carrier to grip opposite faces of the work and move the latter longitudinally in contact with the edging elements, backing rollers for the belts, means to operate the belts, and means to adjust the upper horizontal beams vertically to regulate contact of the edging elements with the work.

In testimony whereof I affix my signature.

JOSEPH CAPELLMAN.